United States Patent [19]
Guidoux

[11] 4,035,725
[45] July 12, 1977

[54] AUTOMATIC PASSBAND EQUALIZER FOR DATA TRANSMISSION SYSTEMS

[75] Inventor: Loic Bernard Yves Guidoux, Le Plessis-Robinson, France

[73] Assignee: Telecommunications Radioelectriques et Telephoniques T.R.T., Paris, France

[21] Appl. No.: 642,079

[22] Filed: Dec. 18, 1975

[30] Foreign Application Priority Data

Dec. 20, 1974  France .................. 74.42251

[51] Int. Cl.² .................. H03H 7/36
[52] U.S. Cl. .................. 325/42; 333/18
[58] Field of Search .......... 325/42, 65, 320, 321, 325/323; 333/18; 328/155, 162, 163, 165, 166, 167; 178/69 R

[56] References Cited
U.S. PATENT DOCUMENTS

| | | | |
|---|---|---|---|
| 3,868,603 | 2/1975 | Guidoux | 333/18 |
| 3,878,468 | 4/1975 | Falconer | 325/320 |
| 3,904,965 | 9/1975 | Leuthold | 325/42 |
| 3,906,347 | 9/1975 | Motley et al. | 328/163 X |

*Primary Examiner*—Benedict V. Safourek
*Attorney, Agent, or Firm*—Frank R. Trifari

[57] ABSTRACT

Passband equalizer in a system for data transmission by means of phase modulation. The equalizer comprises two filters in quadrature with adjustable coefficients. Difference circuits connected to the equalizer output form difference signals between the two quadrature components of the equalizer output signal and the two components of an estimated signal which is especially formed from phase jumps associated with the transmitted data signal. A pair of difference circuits is associated with each pair of corresponding coefficients of the two filters and forms difference signals from both components of the passband signals available in the two filters in places corresponding with the said pair of coefficients. The changes in the coefficients are calculated from the above said difference signals.

13 Claims, 18 Drawing Figures

AUTOMATIC PASSBAND EQUALIZER FOR DATA TRANSMISSION SYSTEMS

The invention relates to an automatic equalizer for qualizing passband signals at the input of a receiver of system for data transmission by means of phase modulation of a carrier, which equalizer comprises two filters having coefficients which are adjustable in successive interation steps, which filters process the passband signal and the quadrature passband signal respectively, the output signal of the equalizer being obtained by combining output signals of the two filters.

Compared with the generally used baseband equalizers which process the demodulated data signal the passband equalizers have the advantage that they are not affected by the quality of the demodulator of the receiver, whilst they enable at the same time a simplification in the construction of this demodulator, which demodulator operates on an equalized signal and so in the best of circumstances.

In order to ensure that a passband signal equalizer fulfills its part to perfection, which part only consists of correcting the distortions in the amplitude-frequency and phase-frequency characteristics of the transmission path, the following rules should be taken into account when designing it. Once the distortions have been corrected by an optimum configuration of the coefficients of the two filters this configuration must not be altered by changes in the phase, amplitude and frequency characteristics of the carrier on receipt. Furthermore the strategy to be followed in the equalizer must be aimed at minimizing the mean-square error in order to take both the noise and the distortions of the transmission path into account and this strategy will have to lead in a reliable manner to the optimum equalization configuration, which configuration must be unique. Finally the equalizer must be designed so that it is fully independent of the demodulation process.

In the known passband equalizers these characteristics are only observed in an imperfect way. The equalizer described in U.S. Pat. No. 3,727,136 operates according to a strategy which is called "Zero-Forcing," which strategy does not take the noise into account and may lead to incorrect minima owing to its non-linear characteristic; furthermore this equalizer is coupled with the demodulation process which must be differential.

It is an object of the invention to provide a passband equalizer of another conception which substantially satisfies all the said above requirements.

In accordance with the invention this equalizer is provided with means for generating in-phase and quadrature components of the equalizer output signal which have been sampled at the data clock frequency, delay circuits for delaying both said components over one period of the data clock frequency, a first phase shifting circuit which produces a phase shift in the signal corresponding with both said delayed components, which phase shift is equal to the sum of on the one hand, each of the phase jumps corresponding with the transmitted data signals and being derived from a phase detector included in the receiver, and on the other hand the phase rotation of the carrier during one period of the data clock frequency, and at least one first difference circuit for generating a difference signal between one of the two said components of the equalizer output signal and a corresponding component of the said phase-shifted delayed signal, which equalizer is furthermore provided in association with each pair of corresponding coefficients of the said two filters with:

a pair of second difference circuits which at their first input receive the passband signal and the quadrature passband signal, respectively, which correspond with said pair of coefficients and have been sampled at the data clock frequency, and which at their second input receive corresponding passband signals which have been delayed over one period of the data clock frequency and shifted in phase by a second phase shifting circuit producing a same phase shift as the first phase shift circuit, a circuit for calculating changes in the said pair of coefficients in the form of products of output signals of said first difference circuit and said pair of second difference circuits.

An embodiment which is favourable as regards its possibilities of application is obtained if the equalizer is provided with a first pair of difference circuits which at their first input receive the samples in-phase and quadrature components of the equalizer output signal respectively and at their second input corresponding components of the said phase-shifted delayed signal of the first phase shifting circuit, and the said calculating circuit is arranged for calculating changes in the said pair of coefficients in the form of two combinations of products of pairs of output signals of the said pairs of first and second difference circuits.

The equalizer according to the invention can be used equally well in data transmission systems which utilize differential phase modulation as in systems which utilize coherent phase modulation. In the latter case, the phase jumps used in the phase shifting circuits are derived from the phase detector of the receiver in the form of the difference between the consecutive phases which are reproduced by this phase detector and which correspond with the consecutive transmitted data signals.

With the aid of some extra circuits in the control device of the coefficients the equalizer according to the invention is equally suitable to be associated with a transmission system which uses amplitude and phase modulation for transmitting the data signals.

As will be shown in the description, the circuits used for the adjustment of the coefficients may be assembled in a very simple manner without detracting from the quality of the equalized signal and without an unacceptable increase of the response time. The implementation of the adjustment device can also be simplified in the in actual practice recurrent case of phase modulation.

The invention will be further explained with reference to the accompanying drawings.

Figure 8:
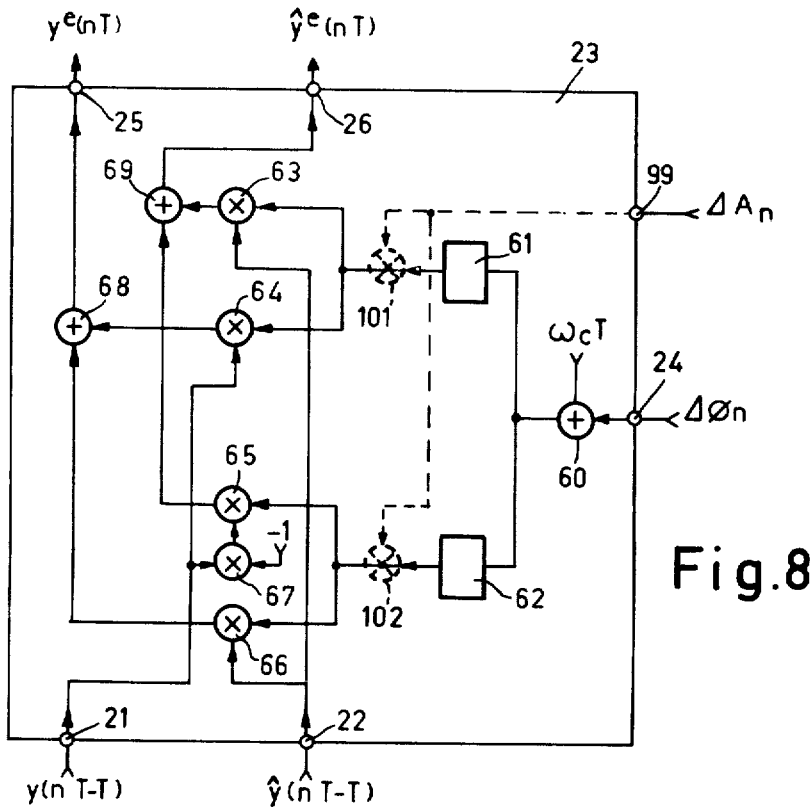
FIG. 8 shows a diagram of an embodiment of a phase shifting circuit used in the equalizer.
Figure 11:
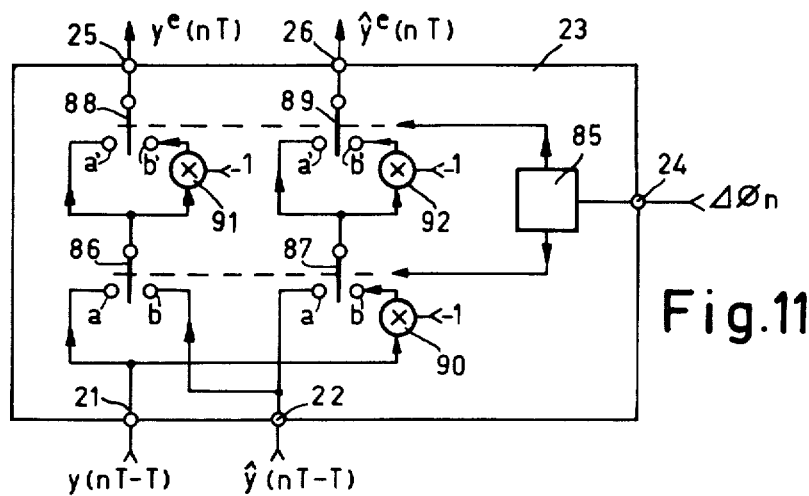
Figure 12:
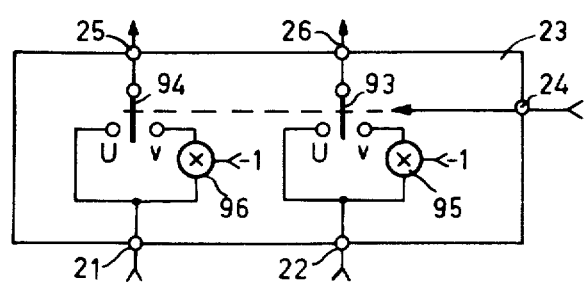

FIG. 11 snd FIG. 12 show diagrams of embodiments of the phase shifting circuit according to FIG. 8 for the case that certain phase jumps are utilized in the equalizer.

Figure 13:
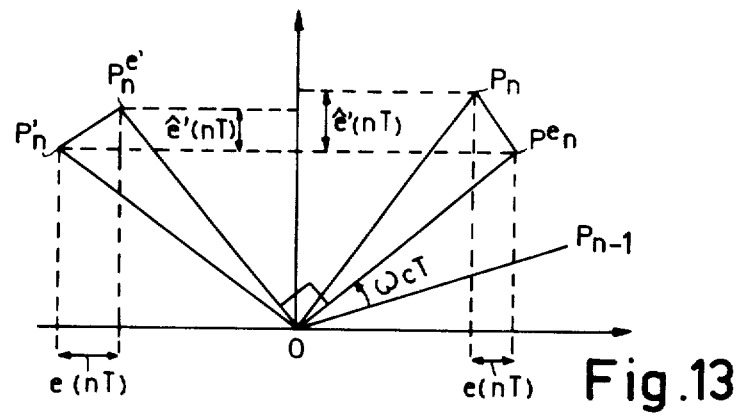

FIG. 13 shows a diagram of the signals which are used for adjusting the equalizer coefficients in the case where a simplified equalizing criterion is utilized.

Figure 9:
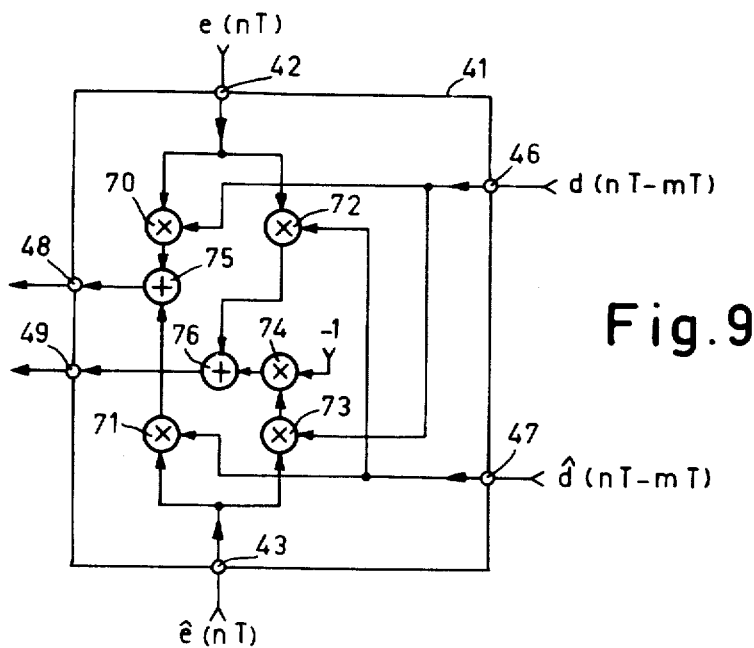
FIG. 9 shows a diagram of an embodiment of the circuit which calculates the modifying terms for the equalizer coefficients.
Figure 14:
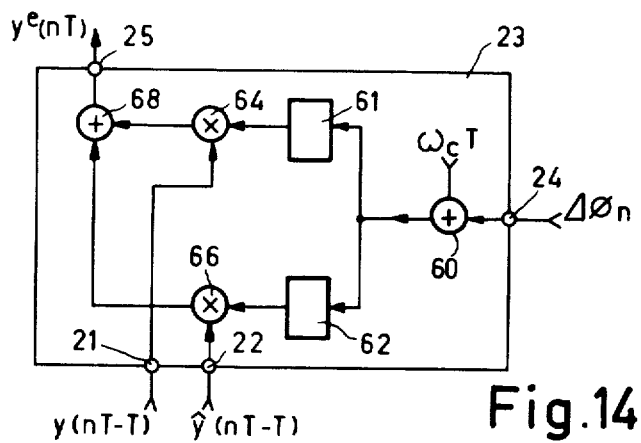
Figure 15:
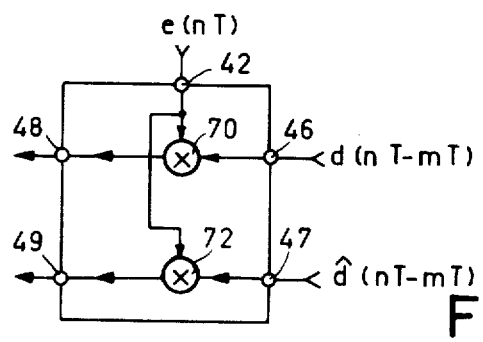

FIG. 14 and FIG. 15 show diagrams of the phase shifting circuit according to FIG. 8 and of the calculating circuit according to FIG. 9 in the case where the simplified equalizing criterion is utilized.

Figure 16:
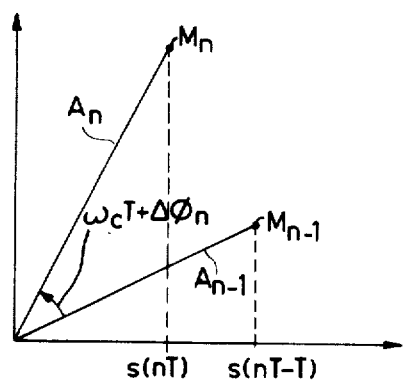
Figure 17:
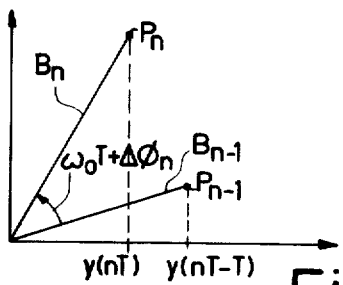

FIG. 16 and FIG. 17 show diagrams of signals showing a characteristic property of a signal modulated in phase and in amplitude, on transmission and on receipt with a perfect equalization respectively.

Figure 18:
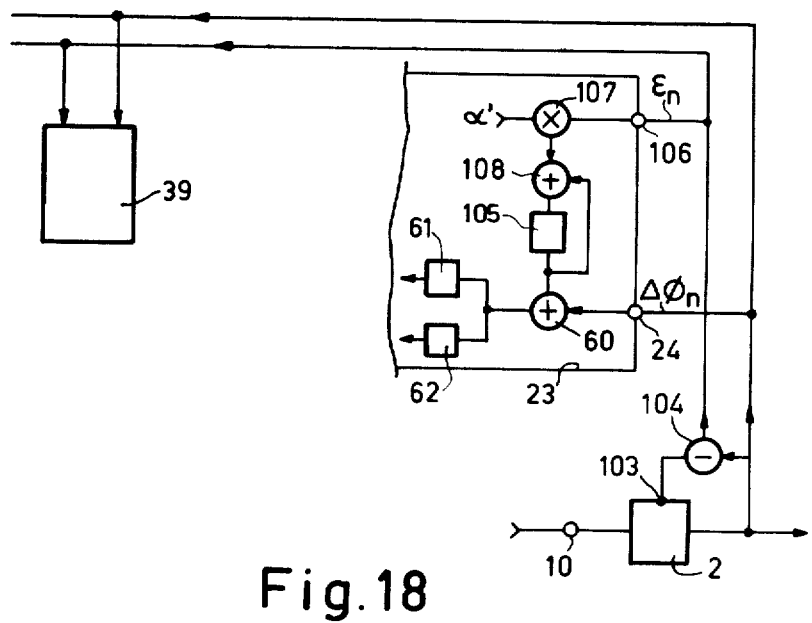

FIG. 18 shows a diagram indicating the changes which are to be effected in the equalizer when the effect of frequency offset caused by the transmission path must be fully suppressed.

Figure 1:
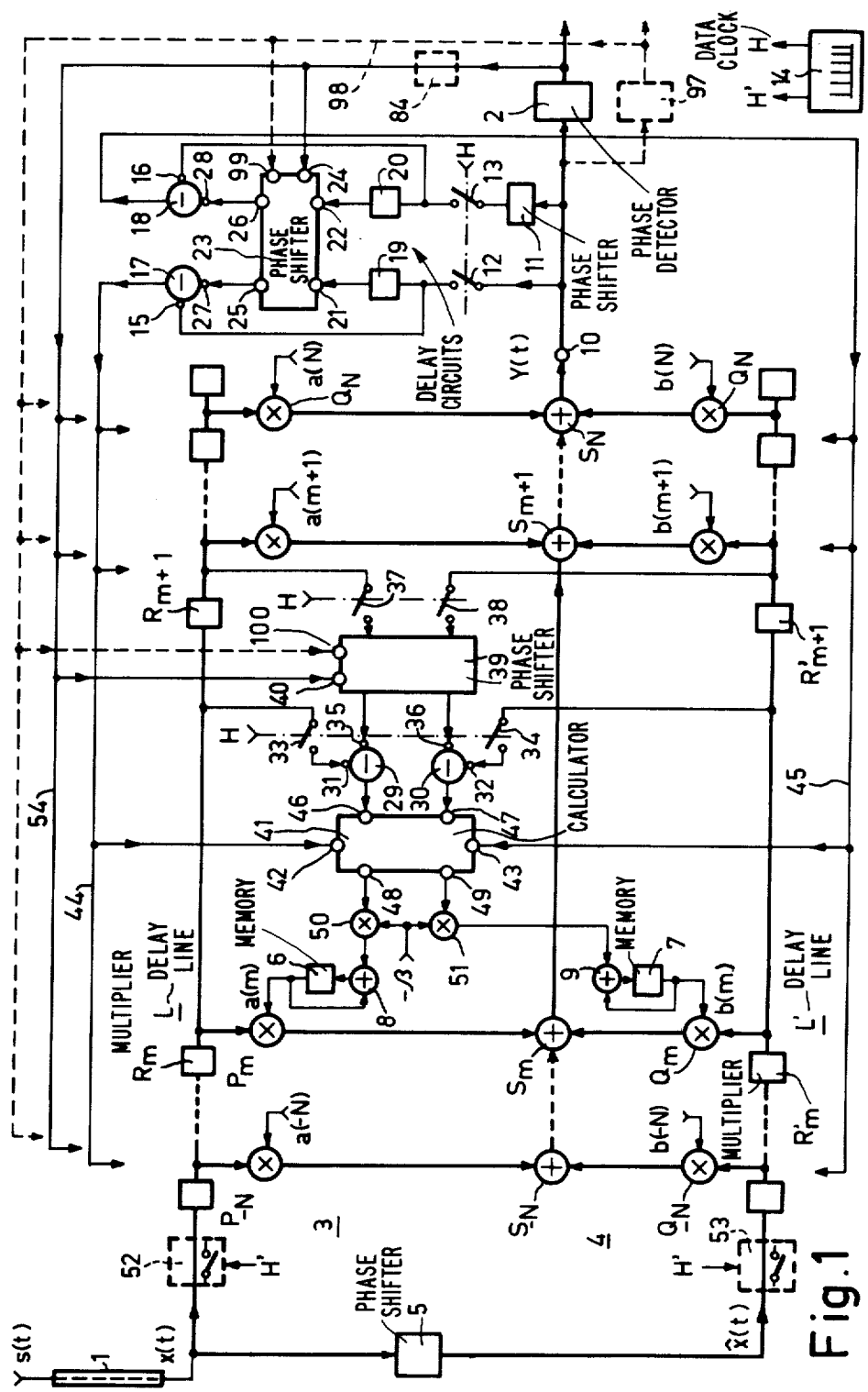
FIG. 1 shows the circuit diagram of the equalizer according to the invention.

The equalizer shown in FIG. 1 is connected to the receiver side of transmission path 1, in which the data signals are transmitted by means of phase modulation and, possibly, amplitude modulation of a carrier. In the first part of the description the case will be considered in which only phase modulation is used. This equalizer precedes a phase detector 2 which is part of the receiver of the transmission system and whose part consists of recovering the phase information corresponding to the data signal that was transmitted at the input of the transmission path. It is an object of the equalizer to correct the amplitude-frequency distortions and phase-frequency distortions of the transmission path 1 so as to supply an equalized passband signal to phase detector 2. In contradistinction to the usual equalizers which operate in the base-band on the demodulated data signal, the present passband equalizer renders it in principle possible to offset the influence by the quality of the signal supplied by the phase detector and to greatly simplify the implementation of the latter.

In order to be able to change the passband signal in phase and in amplitude so as to automatically compensate for the distortions by the transmission path, the equalizer according to FIG. 1 is composed in known manner of two filters 3 and 4 having iteratively adjustable coefficients. The filter 3 operates direct on the passband signal of transmission path 1. The filter 4 operates on the passband signal which is shifted 90° in phase by a phase shifter 5. In the example of FIG. 1 the two filters 3 and 4 are realized as transversal filters which comprise the following corresponding elements. Delay lines L, L', which are formed by the cascade arrangement of delay circuits such as $R_m$, $R'_m$, each producing a delay T equal to the data clock interval. Connected to the taps between the delay circuits of the two delay lines L, L' are multipliers $P_m$, $Q_m$ which multiply the signals present at these taps by coefficients. These coefficients are called $a(m)$ and $b(m)$ respectively for the in-phase filter 3 and for the quadrature filter 4. Each filter uses 2N+1 coefficients and $m$ may be any integer between −N and +N. The corresponding coefficients of the two filters $a(m)$ and $b(m)$ are characterized by the same values of $m$ and herewith the multipliers $P_m$ and $Q_m$ correspond, which receive in-phase and quadrature passband signals which have been delayed by the same value $m$ T. So it is assumed that the delay of the in-phase and quadrature passband signals is zero if they occur in the centre of the delay lines L and L'. The central coefficients $a(o)$ and $b(o)$ of the two filters have fixed values namely 1 and 0 respectively. The other coefficients $a(m)$ and $b(m)$, where $m$ differs from zero, are adjustable. They are stored in memories such as 6 and 7 for any pair of corresponding coefficients. At any iteration step for adjustment of these coefficients, the contents of these memories 6, 7 are fed to an input of adders 8, 9 and simultaneously the modifying terms of the coefficients are fed to the other input of these adders 8, 9. The output signal of the multipliers $P_m$ and $Q_m$ are combined in a cascade arrangement of adders $S_m$. The output of the last adder $S_N$ constitutes the equalizer output 10 which is connected to phase detector 2.

The invention now provides a device for such an adjustment of the coefficients of the in-phase and quadrature filters that the assembly of the two filters automatically corrects the amplitude-frequency and phase-frequency distortions of the transmission path.

In accordance with the invention the equalizer is provided with a phase shifter 11 which shifts the signal at equalizer output 10 over 90°. The in-phase and quadrature components of the equalizer output signal are sampled by sampling circuits 12, 13 which are controlled synchronously at the data signal rate $H=1/T$ derived from a local data clock generator 14. These sampled in-phase and quadrature components are supplied to first input terminals 15, 16 of difference circuits 17, 18 and also to delay circuits 19, 20 which produce a delay equal to the data clock interval T. The two components delayed in this manner are supplied to input terminals 21, 22 of a phase shifting circuit 23 which produces a phase shift $\Delta\phi_n + \omega_c T$ in the signal corresponding with the two components at its input, where $\Delta\phi_n$ represents each of the phase jumps corresponding with the transmitted data signals and $\omega_c$ the frequency of the carrier at the transmitter side, so that $\omega_c T$ is the phase rotation of this carrier during the data clock interval T. In the case where the data transmisson is performed by means of differential phase modulation, phase detector 2 is of the differential type and the data signals are recovered in the form of phase jumps $\phi_n$ which, as shown in FIG. 1, are directly supplied to an input 24 of phase shifting circuit 23. In the case where coherent phase modulation is used, the data signals are recovered in phase detector 2 in the form of phases $\phi_n$, from which the phase jumps to be applied to phase shifting circuit 23 can easily be obtained. The two components obtained at outputs 25 and 26 of phase shifting circuit 23 are supplied to second input terminals 27, 28 of difference circuits 17, 18. These difference circuits provide difference signals sampled at instants $nT$ determined by the data clock H controlling sampling circuits 12, 13.

Furthermore the equalizer comprises, in association with each pair of corresponding coefficients $a(m)$, $b(m)$ of the two filters 3 and 4:

1. A pair of difference circuits 29, 30 which at their first input terminals 31, 32 receive the in-phase and quadrature passband signals corresponding with said pair of coefficients and being sampled at the data clock rate H in sampling circuits 33, 34. The in-phase and quadrature passband signals corresponding with the coefficients $a(m)$ and $b(m)$ are the signals which are supplied to the multipliers $P_m$ and $Q_m$. They are available between two successive delay circuits ($R_m$, $R_{m+1}$) and ($R'_m$, $R'_{m+1}$) which are part of delay lines L and L' of in-phase filter 3 and of quadrature filter 4. The second input terminals 35, 36 of difference circuits 29, 30 receive the signals which have been derived from the in-phase and quadrature passband signals available in delay lines L and L' at the output of circuits $R_{m+1}$ and $R'_{m+1}$ which produce a delay T equal to the data clock interval. These passband signals are first sampled at the data clock rate H in sampling circuits 37, 38 and thereafter supplied to a phase shifting circuit 39 which is identical to phase shifting circuit 23 and which consequently produces the above-mentioned phase shift $\Delta\phi_n + \omega_c T$ in the signal corresponding with the in-phase and quadrature components at its input. So phase shifting circuit 39 has an input 40 which is connected through a lead 54 to the output of phase detector 2 to receive the phase jumps $\Delta\phi_n$. The two output signals of phase shifting circuit 39 are supplied to the second input terminals 35, 36 of difference circuits 29, 30. These difference circuits provide sampled difference signals at instants $nT$ determined by the data clock H controlling sampling circuits 33, 34 and 37, 38.

2. A circuit 41 for calculating at each sampling instant $nT$ the terms which are used to change the corresponding coefficients $a(m)$ and $b(m)$. The inputs 42, 43 of this calculation circuit 41 are connected through leads 44, 45 to the outputs of difference circuits 17, 18 to receive the difference signals $e$ and $\hat{e}$ respectively which have been sampled at the instants $nT$. The other inputs 46, 47 of this circuit 41 are connected to difference circuits 29, 30 to receive the difference signals $d$ and $\hat{d}$ respectively which have been sampled at the instants $nT$. The circuit 41 calculates at the sampling instants $nT$ the following functions of the signals supplied to its input: $(ed + \hat{e}\hat{d})$ and $(e\hat{d} - \hat{e}d)$. The two corresponding signals at the outputs 48, 49 of circuit 41 are multiplied by a coefficient $(-\beta)$ by means of multipliers 50 and 51. The latter supply to adders 8 and 9 the changes in the coefficients $a(m)$ and $b(m)$ of filters 3 and 4.

In the equalizer according to the invention just described, all circuits are of the analog type because the in-phase and quadrature passband signals supplied to filters 3 and 4 are analog. The same equalizer may consist of digital circuits if at the input of filters 3 and 4 analog-to-digital converters 52 and 53 are included which supply digital signals corresponding with the in-phase and quadrature passband signals. The sampling frequency H' in analog-to-digital converters 52 and 53 will, in accordance with the known Shannon theorem, be of course at least equal to double the highest frequency of the passband signal and, necessarily, higher than the data clock frequency H. It should be noted that in that case the circuits with which the equalizer filters are composed— especially the multipliers such as $P_m$, $Q_m$ and the adders such as $S_m$ — will operate with the sampling frequency H'; the equalized signal at the output 10 will also be obtained with a sampling frequency H'; on the other hand the circuits which co-operate in the calculation of the change in the coefficients $a(m)$ and $b(m)$ of the two filters will operate with the data clock frequency H.

Whatever the analog or digital implementation of the equalizer of the invention may be, the working principle and the characteristics thereof are the same and for a detailed description of this operation and the characteristics obtained it is assumed that the equalizer is constructed in analog form.

On account of the fact that the equalized passband signal must have the same characteristics as the transmitted phase modulated signal, it is useful to analyse the characteristics of this latter signal. In general a modulated signal $s(t)$ may be represented by the equation:

$$s(t) = R(t).\cos[\omega_c t + \Psi(t)] \qquad (1)$$

where:
$\omega_c$ is the frequency of the transmitter carrier,
$R(t)$ is the amplitude of the signal $s(t)$,
$\omega_c t + \Psi(t)$ is the phase of the signal $s(t)$, the part $\Psi(t)$ being caused by the phase modulation in the case that $s(t)$ is modulated in phase.

Figure 2:
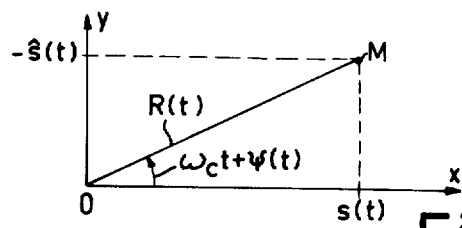
FIG. 2 is a diagram showing a geometrical representation of modulated signals as used in the description.

To represent a modulated signal $s(t)$ a geometrical construction will hereafter often be used which is shown in FIG. 2. In the diagram of FIG. 2 point M has so been drawn in the plane of co-ordinates $x$ $o$ $y$ that $OM = R(t)$ and $(\vec{Ox}, \vec{OM}) = \omega_c t + \Psi(t)$. The absciss of the point M is the signal $s(t)$. It can easily be proved that the ordinate of the point M has the value $-\hat{s}(t)$ where $\hat{s}(t)$ is the signal obtained by shifting $s(t)$ 90° in phase. The point M is called the image of the signal $s(t)$. This signal $s(t)$ is fully determined either by knowing the amplitude $R(t)$ and the phase $\omega_c t + \Psi(t)$ or by knowing this signal $s(t)$ itself and the signal $\hat{s}(t)$ obtained by a phase shift of the signal $s(t)$ over 90°.

In the case where the signal $s(t)$ of formula (1) is modulated in phase by data signals $\alpha_n$ and its spectrum is not limited, it has the following properties:

The amplitude $R(t)$ of it has a constant value A at each value of the time $t$.

The part $\Psi(t)$ of the phase assumes the different values $\theta_n$ which correspond with the data signals $\alpha_n$ to be transmitted at the rate $1/T$ during all time intervals $t$ which satisfy $nT - (T/2) \leq t < nT + (T/2)$.

$\theta_n$ may show two forms:
$\theta_n = \alpha_n$ for coherent phase modulation
$\theta_n = \alpha_n + \theta_{n-1}$ for differential phase modulation.

Figure 3:
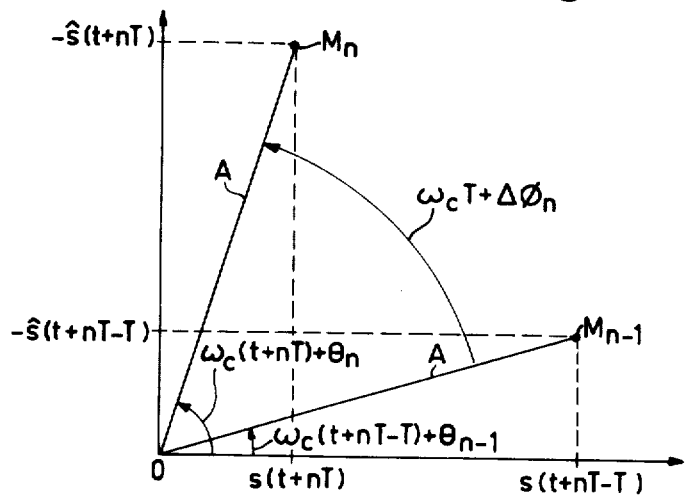
FIG. 3, FIG. 4 and FIG. 5 are signal diagrams showing a characteristic property of a phase modulated signal on transmission with a non-limited spectrum, on transmission with a limited spectrum and on receipt with a perfect equalization respectively.

By means of the diagram of FIG. 3 the essential characteristic of an phase modulated data signal will hereafter be explained by considering the ideal case in which the spectrum of this signal is not limited. In this diagram which uses the representation of FIG. 2 the image $M_{N-1}$ of the signal $s(t+nT-T)$ is constructed, which signal is transmitted during the time interval $T+nT-T$, $t$ being situated between $-T/2$ and $+T/2$. The amplitude $OM_{n-1}$ of this signal has the value $A$. The phase is equal to $\omega_c(t+nT-T) + \theta_{n-1}$, where $\theta_{n-1}$ is the part of this phase which corresponds with the phase modulation. In accordance with FIG. 2 the absciss of the point $M_{n-1}$ is the signal $s(t+nT-T)$ and its ordinate is $-\hat{s}(t+nT-T)$, $\hat{s}(t+nT-T)$ being derived from $s(t+nT-T)$ by a 90° phase shift.

The image $M_n$ of the signal $s(t+nT)$ during the time interval $t+nT$) is constructed in the same way. The amplitude $OM_n$ of this signal has the value A. Its phase is equal to $\omega_c(t+nT) + \theta_n$, where $\theta_n$ is the part of this phase that corresponds with the phase modulation. The absciss of the point $M_n$ is $s(t+nT)$ and its ordinate is $-\hat{s}(t+nT)$.

From the diagram of FIG. 3 it is clear that the point $M_n$ can be derived from the point $M_{n-1}$ by rotating the vector $\overrightarrow{OM}_{n-1}$ over an angle which is equal to $\omega_c T + \Delta\phi_n$, where $\Delta\phi_n$ is equal to $\theta_n - \theta_{n-1}$. This angle is the sum of the continuous phase change of the non-modulated carrier with frequency $\omega_c$ during the data clock interval T and of the phase jump $\Delta\omega_n$ which is produced by the phase modulation.

By means of the usual trigonometrical formulas it can be proved with the aid of the diagram of FIG. 3 that the co-ordinates of the points $M_n$ and $M_{n-1}$ satisfy the following relations:

$$\begin{cases} s(t+nT)=s(t+nT-T).\cos(\omega_c T+\Delta\phi_n)+\hat{s}(t+nT-T).\sin(\omega_c T+\Delta\phi_n) \\ \hat{s}(t+nT)=\hat{s}(t+nT-T).\cos(\omega_c T+\Delta\phi_n)-s(t+nT-T).\sin(\omega_c T+\Delta\phi_n) \end{cases} \quad (2)$$

The geometrical construction of FIG. 3 of the relations (2) characterizes the phase modulation in a perfect way.

In practice the spectrum of the phase-modulated signal supplied to the input of transmission path 1 is not unlimited, as has been assumed sofar, but limited by a filter having the bandwith of the transmission channel. This means that the construction of FIG. 3 and the relation (2) do no longer apply for each instant $t$ which is situated between $-T/2$ and $+T/2$. But in accordance with the usual practice in data transmission, a Nyquist filter is used for limiting the spectrum of the transmitted signal and the construction of FIG. 3 and the relations (2) are then valid at the instant $t = 0$.

After all the phase-modulated signal which, after its spectrum has been limited by a NYquist filter, is supplied to the transmission path, is fully characterized by the following relations been derived from the relations (2) by making $t = 0$.

$$\begin{cases} s(nT)=s(nT-T)\cos(\omega_c T+\Delta\phi_n)+\hat{s}(nT-T)\sin(\omega_c T+\Delta\phi_n) \\ \hat{s}(nT)=\hat{s}(nT-T)\cos(\omega_c T+\Delta\phi_n)-s(nT-T)\sin(\omega_c T+\Delta\phi_n) \end{cases} \quad (3)$$

Figure 4:
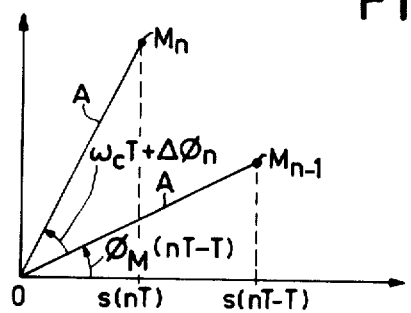

Likewise the diagram of FIG. 3 which has been reduced to its essential elements passes into that of FIG. 4 which shows that the image point $M_n$ of the signal $s(nt)$ is derived from the image point $M_{n-1}$ of the signal $s(nT-T)$ by rotation over an angle equal to $\omega_c T + \Delta\phi_n$.

The signal $x(t)$ which is obtained at the receiver side of the transmission path 1 does not represent the signal $s(t$ transmitted, in particular at the instants $nT$, owing to the phase and amplitude distortions of this path. These distortions namely have two effects:

A first effect consists of the change of each sample $s(nT)$ by changing its phase and amplitude.

A second effect consists of the fact that the received signal $x(nT)$ not only depends on the transmitted signal $s(nT)$ but on all preceding and following signals $s(nT-kT)$, where k varies from $-\infty$ to $+\infty$, these signals themselves being subjected to the first effect. This second effect corresponds with intersymbol interference between signals transmitted at different instants.

It is clear that the received signal $x(t)$ which results from these two effects does not have the same form as the transmitted signal $s(t)$ and, in particular at the instants $nT$, it does not have any longer the property of the phase-modulated transmitted signal which is characterized by the diagram of FIG. 4 or the relations (3).

To correct these two effects of the transmission path the equalizer of FIG. 1 uses in known manner an input phase filter 3 to which the passband signal $x(t)$ is supplied and a quadrative filter 4 to which a signal $\hat{x}(t)$ is supplied which is obtained by shifting the pass band signal $x(t)$ over 90° by means of a phase shifter 5. The signal $y(t)$ which is obtained at the equalizer output 10 is a combination of the output signals of the two filters 3,4 and has the shape:

$$y(t) = \sum_{m=-N}^{+N} a(m) \cdot x(t-mT) + b(m) \cdot \hat{x}(t-mT) \quad (4)$$

where $mT$ is the delay at the various taps of the delay lines L and L' of the two filters.

The invention provides a new device for adjusting the coefficients $a(m)$ and $b(m)$ of the two filters to correct automatically the distortions of the transmission path. The thought underlying the invention is that for this purpose the signal $y(t)$ at the equalizer output need only have at each instant $nT$ one property which is analogous to the property of the transmitted signal, which is characterized in geometrical form by the diagram of FIG. 4 or in algebraic form by the relations (3).

Figure 5:
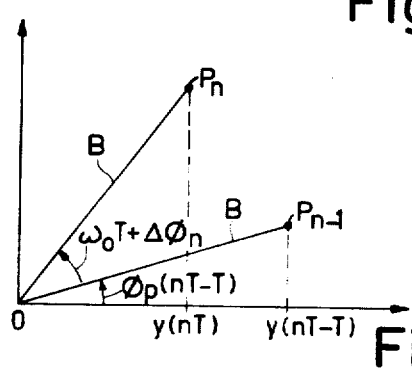

The geometrical property which the signal $y(T)$ at the equalizer output must have, is represented in the diagram of FIG. 5. In the diagram the point $P_{n-1}$ is the image of the signal $y(nT-T)$. The amplitude B and the phase $\phi_p(NT-T)$ of this signal necessarily differ in general from the amplitude A and from the phase $\phi_M(nT-T)$ of the corresponding transmitted signal $s(nT-T)$, whose image is $M_{n-1}$ in the diagram of FIG. 4. The image point $P_n$ of the signal $y(nT)$ is derived from the point $P_{n-1}$ by rotation over an angle $\omega_o T + \Delta\phi_n$ where $\phi_o$ is the frequency of the carrier on receipt. It should be noted that we have not, as in the diagram of FIG. 4 corresponding with the transmitted signal, used the rotation over an angle $\omega_c T + \Delta\phi_n$ in which the frequency $\omega_c$ of the transmitter carrier wave occurs, to take the fact into account that the frequency $\omega_o$ on receipt may differ from the frequency $\omega_c$ at the transmitter side when frequency offset is produced in the transmission path.

A signal y(nT) (nT) the output of the equalizer wihich prossesses the property illustrated in the diagram of FIG. 5 corresponds with a perfect equalization of the passband signal, even if, as is generally the case its amplitude B and its phase $\phi_P(nT-T) + \omega_o T + \Delta\phi_n$ differ from the amplitude A and the phase $\phi_M(nT-T) + \omega_c T + \Delta\phi_n$ of the corresponding transmitted signal $s(T)$. Namely, the phase detector 2 to which such a signal is applied is, owing to its construction, insensible for constant amplitudes and phases, and, it if is of the differential type, this phase detector has only when designed for recovering the phase jumps $\Delta\phi_n$ which correspond with the transmitted data signals. If the phase detector is of the coherent type it has only been designed for recovering the phases $\phi_n$ which correspond with the transmitted data signals, from which phases $\phi_n$ the phase jumps $\Delta\phi_n$ can be derived by difference production.

The geometrical property of FIG. 4 which the image of the equalized signal must have, may, as for the transmitted signal, be converted to algebraic form:

$$\begin{cases} y(nT) = y(nT-T)\cos(\omega_o T + \Delta\phi_n) + \hat{y}(nT-T)\sin(\omega_o T + \Delta\phi_n) \\ \hat{y}(nT) = \hat{y}(nT-T)\cos(\omega_o T + \Delta\phi_n) - y(nT-T)\sin(\omega_o T + \Delta\phi_n) \end{cases}$$

As will be shown hereafter, for the greater part of the transmission media, such as transmission lines, the passband signal may be considered as having been substantially equalized if the output signal of the equalizer has the geometrical property of FIG. 5 or satisfies the relations (5) when, instead of the frequency $\omega_o$ on receipt the transmitter frequency $\omega_c$ is used which may differ from the frequency $\omega_o$ in the case of frequency offset produced by the transmission path. Except when the contrary is asserted this case will be discussed hereafter.

Figure 6:
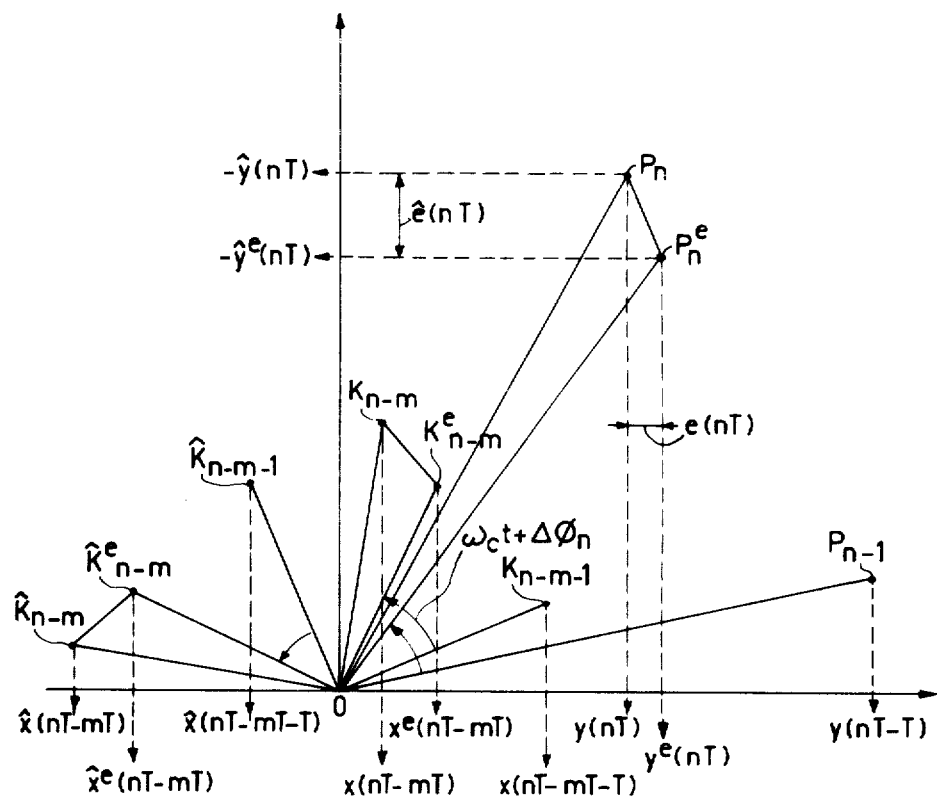
FIG. 6 is a diagram of the signals which are used to adjust the equalizer coefficients.

Hereafter, by means of the diagram of FIG. 6 the criterion used in the equalizer of the invention for adjusting the coefficients $a(m)$, $b(m)$ will be explained in the way this criterion has been described so far. Starting from the image $P_{n-1}$ of the signal $y(nT-T)$ which was obtained at the instant $(nT-T)$ at the output of the equalizer, an image $P_n^e$ of an estimated signal $y^e(nT)$ at the equalizer output at the instant $nT$ is formed in this diagram by rotating the vector $OP_{n-1}$ over an angle $\omega_c T + \Delta\phi_n$. In other words, $P_n^e$ satisfies the looked-for geometrical property of the equalized signal and its co-ordinates $y^e(nT)$ and $-\hat{y}^e(nT)$ satisfy the relations (5) by substituting $\omega_c$ for $\omega_o$. In the diagram of FIG. 6 the image $P_n$ of the signal $y(nT)$ actually obtained at the equalizer output at the instant $nT$ is also formed. This image does not satisfy the geometrical property of the equalized signal and its co-ordinates $y(nT)$ and $-\hat{y}(nT)$ do not satisfy the relations (5). The criterion used in the equalizer consists of minimizing, with the aid of the coefficients $a(m)$ and $b(m)$, a quantity $f$ which is equal to the mean-square value of the distance between the images $P_n^e$ and $P_n$.

This quality $f$ may be written as:

$$f = E\,|\overrightarrow{P_n^e P_n}|^2 \tag{6}$$

where E represents the average value and where $|\overrightarrow{P_n^e P_n}|$ represents the modulus of the vector $\overrightarrow{P_n^e P_n}$.

This quality $f$ is a function of the coefficients $a(m)$ and $b(m)$ and these coefficients will have their optimum configuration which minimizes $f$ when:

$$\begin{cases} \dfrac{\delta f}{\delta a(m)} = 0 \\ \dfrac{\delta f}{\delta b(m)} = 0 \end{cases} \tag{7}$$

$m$ being an integer which differs from 0 and varies between $=N$ and $+N$.

In practice, for performing the criterion, instead of calculating the values of the coefficients $a(m)$ and $b(m)$ as solutions of the equations (7) the coefficients are adjusted in successive iteration steps by utilizing the gradient algorithm This algorithm manifests itself in the following two recursion formulas, one of which corresponds with the adjustment of the coefficients $a(m)$ and the other with the adjustment of the coefficients $b(m)$.

$$\begin{cases} a(m)^{n+1} = a(m)^n - \alpha \dfrac{\delta f}{\delta a(m)} \\ b(m)^{n+1} = b(m)^n - \alpha \dfrac{\delta f}{\delta b(m)} \end{cases} \tag{8}$$

These formulas (8) imply that the coefficients $a(m)$ and $b(m)$ at iteration step $n$ are changed for the nest iteration step $(n+1)$ by the amounts $$-\alpha \frac{\delta f}{\delta a(m)} \text{ and } -\alpha \frac{\delta f}{\delta b(m)},$$

which have been calculated at iteration step $n$, $\alpha$ being a constant coefficient.

Now the partial derivatives $$\frac{\delta f}{\delta a(m)} \text{ and } \frac{\delta f}{\delta b(m)}$$

will be calculated which occur in the recursion formulas (8). When taking the definition of $f$ into account which is given by the formula (6), these derivatives may be written as:

$$\begin{cases} \dfrac{\delta f}{\delta a(m)} = 2E\left[\overrightarrow{P_n^e P_n} \cdot \dfrac{\delta \overrightarrow{P_n^e P_n}}{\delta a(m)}\right] \\ \dfrac{\delta f}{\delta b(m)} = 2E\left[\overrightarrow{P_n^e P_n} \cdot \dfrac{\delta \overrightarrow{P_n^e P_n}}{\delta b(m)}\right] \end{cases} \tag{9}$$

In order to calculate in these formula (9)

$$\frac{\delta \overrightarrow{P_n^e P_n}}{\delta a(m)} \text{ and } \frac{\delta \overrightarrow{P_n^e P_n}}{\delta b(m)}$$

$$\overrightarrow{P_n^e P_n}$$

must be expressed as a function of the coefficients $a(m)$ and $b(m)$ According to the diagram of FIG. 6 it holds:

$$\overrightarrow{P_n^e P_n} = \overrightarrow{OP_n} - \overrightarrow{OP_n^e} \tag{10}$$

$P_n$ is now the image of the signal $y(nT)$ which is supplied by the equalizer at the instants $nT$ and the formula for $y(nT)$ is given by formula (4) as a function of the coefficients $a(m)$ and $b(m)$ and of the signals $x(nT-mT)$ and $\hat{x}(nT-mT)$ which are found at the instants $nT$ at the various taps of the in-phase and quadrature filters.

Formula (4) can then be written in vector form by constructing, as shown by the diagram of FIG. 6, a point $K_{n-m}$ which is the image of the signal $x(nT-mT)$ at the tap of the in-phase filter 3 where the delay is $mT$, as well as at the point $\hat{K}_{n-m}$ which is derived from the point $K_{n-m}$ by a rotation over an angle of 90°, this point $\hat{K}_{n-m}$ being the image of the signal $\hat{x}(nT-nT)$ at the tap of the quadrature filter 4 where the delay is $mT$. It should be noted that the ordinate of the point $K_{n-m}$ is nothing else than $\hat{x}(nT-mT)$.

Formula (4) is then written in vector form:

$$\vec{OP_n} = \sum_{m=-N}^{+N} \left[ a(m) \cdot \vec{OK_{n-m}} + b(m) \cdot \vec{O\hat{K}_{n-m}} \right] \quad (11)$$

The vector $OP_n^e$ of formula (10) may be written in an analogous manner:

$$\vec{OP_n^e} = \sum_{m=-N}^{+N} \left[ a(m) \cdot \vec{OK_{n-m}^e} + b(m) \cdot \vec{O\hat{K}_{n-m}^e} \right] \quad (12)$$

In the same manner in which the vector $OP_n^e$ is derived from the vector $\vec{OP_{n-1}}$ by rotation over an angle $\omega_c T + \Delta\phi_n$, the vectors $\vec{OK^e_{n-m}}$ and $\vec{O\hat{K}^e_{n-m}}$ in formula (12) are derived from the vectors $\vec{OK_{n-m-1}}$ and $\vec{O\hat{K}_{n-m-1}}$ by a rotation over an angle $\omega_c T + \Delta\phi_n$. The point $K_{n-m-1}$ in the diagram of FIG. 3 is the image of the signal $x(Nt-mT-T)$ at the tap of in-phase filter 3 where the delay is $mT+T$. The point $\hat{K}_{n-m-1}$ which is derived from the point $K_{n-m-1}$ by means or rotation over angle of 90° is the image of the signal $\hat{x}(nT-mT-T)$ at the tap of the quadrature filter 4 where the delay $nT$—is $mT+T$. The points $K^e_{n-m}$ and $\hat{K}_{n-m}$ are images of the estimated signals $x^e(nT-mT)$ and $\hat{x}^e(nT\ mT)$ at the taps of the filters 3 and 4 where the delay is $mT$, which estimated signals are formed in the indicated manner, the images of the real signals at the taps being the point $K_{m-1}$ and $\hat{K}_{m-n}$. In this respect it sould be noted that the ordinates of the points $K_{n-m-1}$ and $K^e_{n-m}$ are nothing else than $-\hat{x}(nT-mT-T)$ and $-\hat{x}^e(nT-mT)$.

Taking the formulas (11 and 12) into account and utilizing the vectors $\vec{K^e_{n-m}\ K_{n-m}}$ and $\vec{K^e_{n-m}\ \hat{K}_{n-m}}$ formula (10) is written as:

$$\vec{P_n^e P_n} = \sum_{m=-N}^{+N} \left[ a(m) \cdot \vec{K^e_{n-m} K_{n-m}} + b(m) \cdot \vec{\hat{K}^e_{n-m} \hat{K}_{n-m}} \right] \quad (13)$$

By using this formula (13) in the relations (9) these relations may be written as:

$$\begin{cases} \dfrac{\delta f}{\delta a(m)} = 2E \left[ \vec{P_n^e P_n} \cdot \vec{K^e_{n-m} K_{n-m}} \right] \\ \dfrac{\delta f}{\delta a(m)} = 2E \left[ \vec{P_n^e P_n} \cdot \vec{\hat{K}^e_{n-m} \hat{K}_{n-m}} \right] \end{cases} \quad (14)$$

By expressing the scalar products of the relations (14) as a function of the co-ordinates of the points $p_n$, $P_n^e$, $K_{n-m}$, $K^e_{n-m}$ by selecting the constant $\beta$ equal to $2\alpha$ and by taking the integration effect of the operator E into account the recursion formula (8) may be written as:

$$\begin{cases} a^{n+1}(m) = a^n(m) - \beta[e(nT) \cdot d(nT-mT) + \hat{e}(nT) \cdot \hat{d}(nT-mT)] \\ b^{n+1}(m) = b^n(m) - \beta[e(nT) \cdot \hat{d}(nT-mT) - \hat{e}(nT) \cdot d(nT-mT)] \end{cases} \quad (15)$$

with $$\begin{cases} e(nT) = y(nT) - y^e(nT) \\ \hat{e}(nT) = \hat{y}(nT) - \hat{y}^e(nT) \end{cases} \quad (16)$$

$$\begin{cases} d(nT-mT) = x(nT-mT) - x^e(nT-mT) \\ \hat{d}(nT-mT) = \hat{x}(nT-mT) - \hat{x}^e(nT-mT) \end{cases} \quad (17)$$

$$\begin{cases} y^e(nT) = x(nT-T)\cos(\Delta\Phi_n+\omega_c T) + \hat{y}(nT-T)\sin(\Delta\Phi_n+\omega_c T) \\ \hat{y}^e(nT) = \hat{y}(nT-T)\cos(\Delta\Phi_n+\omega_c T) - y(nT-T)\sin(\Delta\Phi_n+\omega_c T) \end{cases} \quad (18)$$

$$\begin{cases} x^e(nT-mT) = x(nT-mT-T)\cos(\Delta\Phi_n+\omega_c T) + \hat{x}(nT-mT-T)\sin(\Delta\Phi_n+\omega_c T) \\ \hat{x}^e(nT-mT) = \hat{x}(nT-mT-T)\cos(\Delta\Phi_n+\omega_c T) - x(nT-mT-T)\sin(\Delta\Phi_n+\omega_c T) \end{cases} \quad 19$$

The relations (18) and (19) are analogous to the relations (5) and give the geometrical construction indicated here above of the estimated images $P_n^e$ and $K^e_{n-m}$ in algebraic form.

The relations (15)–(19) indicate all the operations to be performed in the equalizer of FIG. 1 for changing the coefficient $a(m)$ and $b(m)$ at each iteration step. Now a description follows how these operations must be performed.

The difference circuits 17 and 18 perform the operations given in formula (16). Applied to their inputs 15 and 16 are the signals $y(nT)$ and $\hat{y}(nT)$ respectively which are supplied by sampling circuits 12 and 13, sampling circuit 12 receiving the signal at equalizer output 10 and sampling circuit 13 receiving the same signal but shifted 90° in phase by phase shifter 11. The estimated signals $y^e(nT)$ and $\hat{y}^e(nT)$ respectively are applied to the other inputs 27 and 28 of difference circuits 17 and 18. In accordance with formula (18) these estimated signals are calculated in phase shifting circuit 23 from the signal $y(nT-T)$ and $\hat{y}(nT-T)$ which are supplied by circuits 19 and 20 which delay the signal $y(nT)$ and $\hat{y}(nT)$ at their input with T and from the phase jumps $\Delta\phi_n$ corresponding with the data signals, which phase jumps are supplied by phase detector 2, the amount $\omega_c T$ being a constant which has been taken into account within phase shifting circuit 23. The difference circuits 17 and 18 supply through leads 44 and 45 the signals $e(nT)$ and $\hat{e}(nT)$ which have been used in calculating the changes of all coefficients $a(m)$, $b(m)$ of the equalizer.

Associated with each pair of corresponding coefficients $a(m)$, $b(m)$ are in the first place the difference circuits 29 and 30 which perform the operations indicated in formula (17). Applied to their input 31, 32 are the signals $x(nT-mT)$ and $\hat{x}(nT-mT)$ respectively which are supplied by sampling circuits 33, 34 connected to the taps of filters 3 and 4 where the delay is $mT$. Applied to the other inputs 35, 36 of difference circuits 29 and 30 are the estimated signals $x^e(nT-mT)$ and $\hat{x}^e(nT-mT)$ respectively. These estimated signals are calculated in accordance with formula (19) in phase shifting circuit 39 from the signals $x(nT-mT-T)$ and $\hat{x}(nT-mT-T)$ supplied by sampling circuits 37, 38 which are connected to the taps of filters 3 and 4 where the delay is $mT + T$ and from the phase jumps $\Delta\phi_n$ which are supplied by phase detector 2 through lead 54. From a comparison of formulas (18) and (19) it appears that phase shifting circuits 23 and 39 perform calculations of the same kind and that they are therefore identical.

The signals $d(nT)$ and $\hat{a}(nT)$ supplied by difference circuits (29, 30) and the signals $e(nT)$ and $\hat{e}(nT)$ supplied by difference circuit 17, 18 are applied to circuit 41 which calculates by means of these signals the two factors of $\beta$ which are indicated in the two relations of formula (15). These two factors are supplied by circuit 41 to the two multipliers 50, 51 for multiplication with $-\beta$. These two multipliers supply at each iteration step $n$ the changes in the coefficients $a^n(m)$, $b^n(m)$ available in memories 6 and 7. Adders 8 and 9 to which the coefficients and the changes are applied supply the changed coefficients $a^{n+1}(m)$, $b^{n+1}(m)$.

After a given number of iteration steps the coefficients $a(m)$ and $b(m)$ of the equalizer reach a configuration in which they are solutions of the systems of equations in formula (7) and in which the equalization criterion which consists of minimizing the quantity $f$ of formula (6) is satisfied. This configuration is unique because $f$ as a function of the coefficients $a(m)$ and $b(m)$ has a quadratic form.

Hereafter it is investigated to which degree the equalizer designed in this manner satisfies the above mentioned requirements. In particular, the equalizer must only correct the distortions in the amplitude-frequency and phase-frequency characteristics of the transmission path. As soon as these distortions have been corrected by an optimum configuration of coefficients, this configuration shall not be changed by changes in the phase, amplitude and frequency characteristics of the carrier on receipt.

When the coefficients have attained their optimum configuration the relations (7) in accordance with the relations (14) change into:

$$\begin{cases} E\left[ \overrightarrow{P_n^e P_n} - \overrightarrow{K_{n-m}^e K_{n-m}} \right] = 0 \\ E\left[ \overrightarrow{P_n^e P_n} \cdot \overrightarrow{\hat{K}_{n-m}^e \hat{K}_{n-m}} \right] = 0 \end{cases} \quad (20)$$

where $m$ is an integer which differs from 0 and varies between $+N$ and $-N$. The various factors in formula (20) are represented in FIG. 6.

It is first of all assumed that the coefficients have obtained their optimum configuration and are fixed and that a random phase jump $\theta_o$ occurs in the transmission path. The effect is that in the diagram of FIG. 6 all vectors with origin 0 and with ends $P_n$, $P_n^e$, $K_{n-m}$, $\hat{K}_{n-m}^e$, $\hat{K}_{n-m}$, $\hat{K}_{n-m}^e$ rotate over an angle $\theta_o$. The vectors $\overrightarrow{P_n^e P_n}$, $\overrightarrow{K_{n-m}^e K_{n-m}}$ and $\overrightarrow{\hat{K}_{n-m}^e \hat{K}_{n-m}}$ then also rotate over an angle $\theta_o$. So the scalar products $\overrightarrow{P_n^e P_n} \cdot \overrightarrow{K_{n-m}^e K_{n-m}}$ and $\overrightarrow{P_n^e P_n} \cdot \overrightarrow{\hat{K}_{n-m}^e \hat{K}_{n-m}}$ remain unchanged, so that the relations (20) are still satisfied. If the equalizer coefficients are released after the phase jump they will not change as, also after the phase jump, they satisfy the relations (20). It is consequently proved that the equalizer is insensible for the phase jumps in the transmission path.

Thereafter it is assumed that, when the equalizer coefficients have attained their optimum configuration and are fixed, the amplitude of the received signal at the input of the equalizer is changed by a factor $h$ owing to a change in the attenuation of the transmission path. In this case the vectors $\overrightarrow{P_n^e P_n}$, $\overrightarrow{K_{n-m}^e K_{n-m}}$ and $\overrightarrow{\hat{K}_{n-m}^e \hat{K}_{n-m}}$ are changed by the same factor $h$ and the scalar products of these vectors which occur in the relations (20) will be changed by a factor $h^2$. Consequently the relations (20) are still satisfied. If the coefficients of the equalizer are released after the amplitude jump they will not change because they satisfy the relations (20). Consequently it has been proved that the equalizer is insensible to the amplitude jumps in the transmission path.

Figure 7:
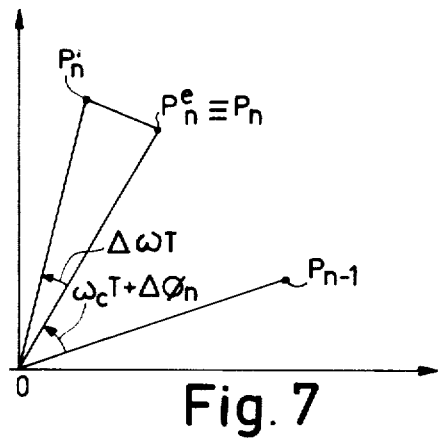
FIG. 7 is a diagram which explaines the influence of frequency offset on the equalizer.

It is finally assumed that the frequency of the received signal at the input at the equalizer is changed from $\omega_c$ to $\omega_o = \omega_c + \Delta\omega$ owing to frequency offset in the transmission path. As in the equalizer described so far the frequency $\omega_c$ of the transmitter carrier has been used, it may be assumed that before the frequency offset, when the equalizer receives the carrier with the frequency $\omega_c$, the equalizer coefficient have attained there optimum configuration which renders the modulus of the vector $\overrightarrow{P_n^e P_n}$ substantially zero; see FIG. 7 which shows that the estimated image $P_n^e$ derived from $P_{n-1}$ by rotation over an angle $\omega_c T + \Delta\phi_n$ coincides with the real image $P_n$. After the frequency offset this actual image $P'_n$ is derived from $P_n$ by rotation over an angle $\Delta\omega T$. If it is assumed that the equalizer coefficients remain fixed in their optimum configuration the vector $\overrightarrow{P_n^e P'_n}$ does not have its minimum value. If the equalizer coefficients are released they will attain a new configuration which will reduce the modulus of the vector $\overrightarrow{P_n^e P'_n}$ without bringing it back to zero, but which is not the preceding optimum configuration. So it appears that the equalizer reacts to frequency offset but it can be proved that the changes which they effect in the coefficients are of the second order in $\Delta\omega T$, which quantity is generally lower than 0.03 for the practical applications of data transmission. These changes will therefore be very slight and negligible.

Now a number of variants of the equalizer according to the invention will be described.

First of all it should be noted that in the equalizer the use of phase shifter 11 may be avoided, which phase shifter produces the equalized quadrature signal. As only the samples of this signal taken at a rate H are used to adjust the equalizer they can be calculated simultaneously with those of the equalized in-phase signal. To this end it suffices to use, with the same configuration of delay lines L and L', in the multipliers $P_m$ and $Q_m$ the coefficients $a(m)$ and $b(m)$ respectively for calculating the equalized in-phase signal and the coefficients $-b(m)$ and $a(m)$ respectively for calculating the equalized quadrature signal.

The construction of phase shifting circuits 23 and 39 and of circuit 41 may be performed in different ways, some of which will here be described by way of example. FIG. 8 shows an embodiment of a phase shifting circuit which is a direct result of the operation indicated in the formulas (18) and (19). It is, for example, assumed that a phase-shifting circuit 23 is concerned, whose input and output terminals have the same reference numerals as in FIG. 1. The phase jumps $\Delta\phi_n$ which are available at input terminal 24 and the constant angular value $\omega_c T$ are supplied to the inputs of an adder 60, which supplies the angular value $\omega_c T + \Delta\phi_n$ to circuits 61 and 62 which calculate the cosine and the sine of this angle respectively. Multipliers 63–67 calculate from these values $\cos(\omega_c T + \Delta\phi_n)$ and $\sin(\omega_c T + \Delta\phi_n)$ and from the signals $y(nT-T)$ and $\hat{y}(nT-T)$ present at input terminals 21 and 22 the four products of formula (18) and that with the sign given therein. Two adders 68, 69 combine these products in accordance with formula (18) and supply the signals $y^e(nT)$ and $\hat{y}^e(nT)$ to output terminals 25 and 26.

FIG. 9 shows an embodiment of the circuit 41 which is the direct result of the operations indicated between brackets in formula (15). The input- and output terminals have the same reference numerals as in FIG. 1. From the signals $e(nT)$ and $\hat{e}(nT)$ present at input terminals 42 and 43 and from the signal $d(nT-mT)$ and $\hat{d}(nT-mT)$ present at the other input terminals 46 and 47, multipliers 70–74 calculate the various products of these signals as they occur in formula (15) and that with the sign given therein. Two adders 75, 76 combine these products in accordance with formula (15), the signals which correspond with these combinations being supplied to output terminals 48 and 49.

Figure 10:
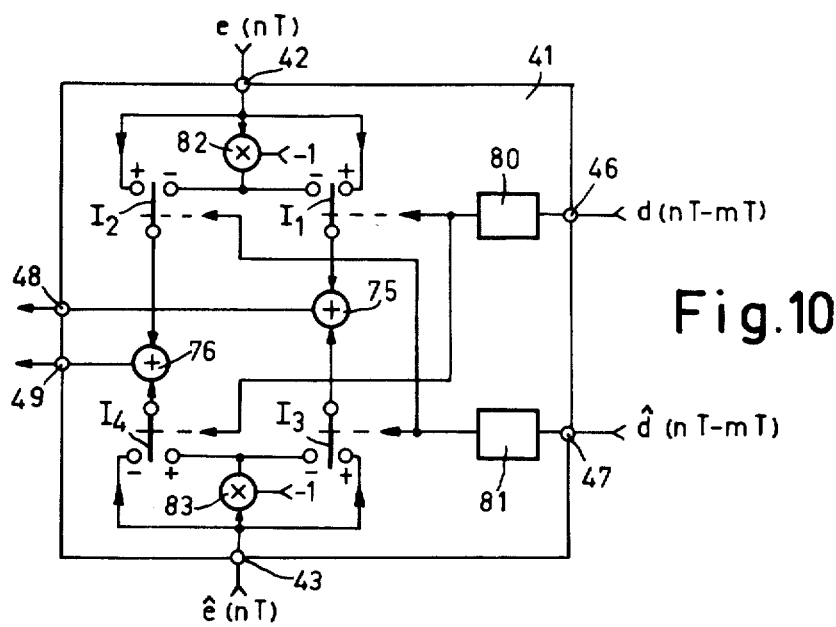
FIG. 10 shows a diagram of a simplified embodiment of the circuit according to FIG. 9.

The construction of phase-shifting circuit 23, 29 and of circuit 41 may be simplified by using a known technique which consists of calculating the products in such a way that only the sign of one or of both factors of this product is taken into account. For example, FIG. 10 shows a simplified variant of circuit 41, in which to calculate the signal products occurring in formula (15), the value of the signals $e(nT)$ and $\hat{e}(nT)$ and only the signal of the signals $d(nT-mT)$ and $\hat{d}(nT-mT)$ are used. The diagram of FIG. 10 comprises certain elements which occur already in the diagram of FIG. 9 and which have been indicated in the same manner. The circuit 41 of FIG. 10 comprises four routing circuits which are represented in the form of two-position transfer switches $I_1, I_2, I_3, I_4$. Switches $I_1$ and $I_4$ are simultaneously set to the positions which are indicated by + and −, and this in accordance with the sign of the signal $d(nT-mT)$ which is detected by a circuit 80. Switches $I_2$ and $I_3$ are simultaneously set to the positions which are indicated by + and −, and this in accordance with the sign of the signal $\hat{d}(nT-mT)$ which is detected by a circuit 81. The signal $e(nT)$ is supplied to the + terminals of switches $I_1, I_2$ and the same signal but now having the opposite sign is supplied to the -terminals of these switches, owing to a multiplier 82. The signal $e(nT)$ is supplied to the + and − terminals respectively of switches $I_3$ and $I_4$ and the same signal, but now having the opposite sign is supplied to the − and + terminals respectively of these switches, owing to an amplifier 83. The inputs of adders 75 and 76 are connected to the moving contacts of the switches ($I_1, I_3$) and ($I_2, I_4$) respectively. It can be easily ascertained that at the outputs of these adders the two combinations of signals are obtained which are shown between brackets in formula (15), in which only the signs of the signals $d(nT-mT)$ and $\hat{d}(nT-mT)$ occur.

Also in the diagram of circuit 41 in FIG. 10 the signals supplied to input terminals 42, 43 on the one hand and to input terminals 46, 47 on the other hand can be interchanged. At the outputs 48 and 49 of circuit 41 the combinations of signals in formula (15) are then obtained in which only the signs of the signals $e(nT)$ and $\hat{e}(nT)$ occur. Finally another, still simpler variant of circuit 41 can be obtained by detecting the sign of the four signals $e(nT), \hat{e}(nT), d(nT-mT), \hat{d}(nT-mT)$ by calculating with the aid of exclusive OR-gates the products of these signals characterized only by their sign and by combining these products in the adders in accordance with the formula (15).

Experience shows that by using in the equalizer according to the invention the simplified variants of this type for the circuits 23, 39 and 41 substantially the same equalization is obtained as with the more complex embodiments of FIG. 8 and FIG. 9 at the cost of only an often acceptable increase in the convergence time of the equalizer.

So far it has been assumed that the device for adjusting the equalizer coefficients performs the calculations of the changes of these coefficients at the rate $1/T$ of the data clock frequency by using in phase shifting circuits 23 and 39 all phase jumps $\Delta\phi_n$ supplied by phase detector 2. It is not always necessary to use all phase jumps in these circuits and it is also possible to calculate the changes of the coefficients only during the appearance of certain jumps at the output of the phase detector. To this end it is sufficient to apply in the equalizer of FIG. 1 in the connection between the output of phase detector 2 and phase shifting circuits 23 and 39 a circuit 84 which selects certain phase jumps. The device for adjusting the coefficients will operate in the manner described above during the appearance of selected phase jumps and, to avoid any change in the coefficients during the appearance of the non-selected phase jumps, for example the signals $e(nT)$ and $\hat{e}(nT)$ supplied by difference circuits 17 and 18 are made equal to zero by means of gates, not shown here, which are controlled by a logic signal which is supplied by circuit 84.

By choosing the selected phase jumps in a suitable manner the construction of phase shifting circuits 23 and 39 can be considerably simplified in most of the practical applications of phase modulation in transmission systems. Such simplifications of the equalizer will be described in the case given by way of example, in which the transmission is done by means of a standardized mode m which transmits 4800 bit per second at a rate of 1600 baud by using eight phase jumps having the values 0°, 45°, 90°, 135°, 180°, −45°, −90°, −135°, the carrier frequency being 1800 Hz. From this it follows that the quantity $\omega_c T$ used in the phase shifting circuit is equal to 45°.

A simplified embodiment of the phase shifting circuit is obtained by selecting the phase jumps 45°, −45°, 135°, −135°. In this case the quantity $\Delta\phi_n + \omega_c T$ can namely only assume the values 0, 90°, −90°, 180° and it is simple to ascertain that the operations performed for example in phase shifting circuit 23, which are indicated in formula (18), are reduced to $$\begin{cases} \Delta\phi_n = -45° & \Delta\phi_n = 45° & \Delta\phi_n = -135° & \Delta\phi_n = 135° \\ y^e(nT) = y(nT-T) & y^e(nT) = \hat{y}(nT-T) & y^e(nT) = -\hat{y}(nT-T) & y^e(nT) = -y(nT-T) \\ \hat{y}^e(nT) = \hat{y}(nT-T) & \hat{y}^e(nT) = -y(nT-T) & \hat{y}^e(nT) = y(nT-T) & \hat{y}^e(nT) = \hat{y}(nT-T) \end{cases} \quad (21)$$

The phase shifting circuit 23 may then be constructed by means of simple routing circuits, as shown in the diagram of FIG. 11. This phase shifting circuit comprises a circuit 85 which receives the selected phase jumps 45°, −45°, 135°, −135° and which, by means of one of its output signals simultaneously sets two switches 86 and 87 to their position $a$ or their position $b$, depending on whether the phase jumps are −45°, 135° or 45°, −135°. By means of the other output signal circuit 85 simultaneously sets two switches 88 and 89 to their position $a'$ or their position $b'$, depending on whether the phase jumps are −45°, 45° or −135°, 135°. The input signal $y(nT-T)$ is supplied to terminal $a$ of switch 86 and with opposite sign to terminal $b$ of switch 87 through multiplier 90. The other input signal $\hat{y}(nT-T)$ is supplied to terminal $b$ of switch 36 and to terminal $a$ of switch 87. The signal at the moving contact of switch 86 is supplied to terminal $a'$ of switch 88 and with an opposite sign to terminal $b'$ of switch 88 through a multiplier 91. The signal at the moving contact of switch 87 is supplied to terminal $a'$ of switch 89 and with an opposite sign to terminal $b'$ of switch 89 through a multiplier 92. It can be easily ascertained that then at the moving contacts of switches 88 and 89 the desired output signals $y^e(nT)$ and $\hat{y}^e(nT)$ occur in accordance with table (21) above.

With the modem considered above phase shifting circuits 23 and 39 can be realized in a still simpler form by selecting only two phase jumps, for example, the phase jumps 135° and −45°. In this case the quantity $\omega_c T + \Delta\phi_n$ can only assume the value 180° or 0°. In that case the operations to be performed by phase shifting circuit 23 can be reduced in accordance with the formula (18) to:

$$\begin{cases} \Delta\phi_n = 135° & \Delta\phi_n = -45° \\ y^e(nT) = -y(nT-T) & y^e(nT) = y(nT-T) \\ \hat{y}^e(nT) = -\hat{y}(nT-T) & \hat{y}^e(nT) = \hat{y}(nT-T) \end{cases} \quad (22)$$

As the diagram of FIG. 12 shows phase shifting circuit 23 may then be constructed with the aid of two switches 93 and 94 which are simultaneously set to the position $u$ or $v$, depending on whether the selected phase jumps are −45° or 135°. The input signals $y(nT-T)$ and $\hat{y}(nT-T)$ are supplied to the terminals $u$ of these switches and with an opposite sign to the terminals $v$ of these switches through multipliers 95 and 96. It is evident that at the moving contacts of both switches the desired output signals are obtained in accordance with the table (22).

With the modem considered so far other groups of phase jumps can be easily found which enable simplifications of the same kind for the phase shifting circuits. For those skilled in the art it will be evident that in other modems the quantities $\omega_c T + \Delta\phi_n$ often have special values which lead to simple constructions of the phase shifting circuits.

The construction of the adjustment device of the equalizer according to the invention can be still further simplified by using a criterion for the equalization which differs from the one used so far. The prior criterion consisted of minimizing the quantity $f = E \mid \overrightarrow{P_n^e P_n} \mid^2$ which can also be described as: $f = E [e(nT)^2 + \hat{e}(nT)^2]$ in which, in accordance with FIG. 6, $e(nT)$ and $\hat{e}(nT)$ are the projections on the two co-ordinate axes of the modulus of the vector $\overrightarrow{P_n^e P_n}$. The new criterion consists of minimizing a quantity:

$$f^* = E [e(nT)^2] \quad (23)$$

It is evident that in general this new criterion need not necessarily result in a perfect equalization which can only be obtained rigourously by minimizing the above quantity $f$. But for special combinations of phase jumps $\Delta\phi_n$ often occurring in practice, this new criterion is equivalent to the prior one and so furnishes the same equalization. These combinations of phase jumps are those for which the phase jumps are 90° apart; satisfactory combinations of phase jumps are, for example −135°, −45°, 45°, 135°, or −180°, −90°, 0°, 90°. By means of the diagram of FIG. 13 it will be demonstrated that in these cases the new criterion is equivalent to the most general criterion. As above, in the diagram the point $P_{n-1}$ is the image of the equalizer output signal at the instant $nT-T$. It is first of all assumed that at the instant $nT$ a phase jump $\Delta\phi_n = 0°$ is detected. The image $P_n^e$ of the estimated signal which corresponds to $\Delta\phi_n = 0°$ is derived from $P_{n-1}$ by a rotation over an angle $\omega_c T$. The image of the real signal at the equalizer output is the point $P_n$. The projections of the modulus of the vector $\overrightarrow{P_n^e P_n}$ on the horizontal and on the vertical axis are $e(nT)$ and $\hat{e}(nT)$ respectively. According to the new criterion the equalizer adjusts its coefficients so that the quantity $e(nT)^2$ is minimized. But a phase jump $\Delta\phi_n = 90°$ could be equally well detected at the instant $nT$. In this case the image $P'^e_n$ of the estimated signal would be derived from $P_{n-1}$ by a rotation over an angle $\omega_c T + 90°$ and the image of the real signal would have been $P'_n$. The projections of the modulus of the vector $\overrightarrow{P'^e_n P'_n}$ on the horizontal and on the vertical axis would have been $e'(nT)$ and $\hat{e}'(nT)$ respectively. The equalizer would have so adjusted its coefficient that the quantity $e'(nT)^2$ is minimized. But according to the construction of FIG. 13 it applies that $e'(nT) = \hat{e}(nT)$ so that everything is done as if the second case it was the quantity $\hat{e}(nT)^2$ which was minimized. From this it follows that with this new criterion, in the case the phase jumps are 90° apart, the equalizer so adjusts its coefficients that statistically both $e(nT)^2$ and $\hat{e}(nT)^2$ are minimized. Consequently in this case the quantity $[e(nT)^2 + \hat{e}(nT)^2]$ on an average is minimized which proves that the new criterion is equivalent to the general criterion.

With this new criterion the coefficients $a(m)$, $b(m)$ of the equalizer are adjusted by utilizing the recursion formulas (15) where it is assumed that $\hat{e}(nT) = 0$. So then the following simplified recursion formula are obtained:

$$\begin{cases} a^{n+1}(m) = a^n(m) - \beta [e(nT) \cdot d(nT - mT)] \\ b^{n+1}(m) = b^n(m) - \beta [e(nT) \cdot \hat{d}(nT - mT)] \end{cases} \quad (24)$$

where according to formulas (16) and (18)

$$e(nT) = y(nT) - y^e(nT) \quad (25)$$

$$y^e(nT) = y(nT)(\cos(\Delta\phi_n + \omega_c T) + \hat{y}(nT-T)\sin(\Delta\phi_n + \omega_c T) \quad (26)$$

The operations to be carried out for calculating the difference signals $d(nT-mT)$ and $\hat{d}(nT-mT)$ are the same as with the general criterion and have been indicated by formula (17) supplemented with formula (19).

The simplifications for the adjustment device of the coefficients in the equalizer according to FIG. 1 are derived from formulas (24), (25), (26). Phase shifting circuit 23 supplies only the signal $y^e(nT)$, the calculation of which is done in accordance with formula (26). It can be easily seen that the diagram according to FIG. 1 of this phase shifting circuit is simplified to that of FIG. 14, in which only the elements having the same reference numerals and contributing to the calculation of $y^e(nT)$ have been retained. Furthermore difference circuit 18 can be dispensed with. Finally, circuit 41 receives only the signals $e(nT)$, $d(nT-mT)$ and $\hat{d}(nT-mT)$ and the calculation of the changes in the coefficients is performed therein in accordance with formula (24), the diagram of FIG. 9 of the circuit 41 being reduced to that of FIG. 15. It is evident that in the equalizer constructed according to the new criterion all the variants described above for the phase shifting circuits and circuit 41 may be applied.

The equalizer according to the invention, described so far which is meant to be combined with a data transmission system utilizing phase modulation is, after some simple changes equally suitable for a data transmission system utilizing phase and amplitude modulation. To explain the construction of an equalizer suitable for such a system, use is made hereinafter of the method which is already used for signals which are only modulated in phase. In the case in which the data signals are transmitted by means of phase and amplitude modulation and in which the spectrum of the signal $s(t)$ which is supplied to the transmission path is limited by a Nyquist filter this transmitted signal $s(t)$, which in general has the form of formula (1):

$$s(t) = R(t) \cdot \cos[\omega_c T + \Psi(t)]$$

shows the following characteristics:

$R(t)$ is such that at the sampling instant $nT$: $R(nT)=A_n$, $\Psi(t)$ is such that at these sampling instants $nT$: $\Psi(nT)=\theta_n$.

The difference with phase modulation only is that the amplitude $A_n$ of the transmitted signal is no longer constant and that the pair $[A_n, \theta_n]$ characterizes the data signal $\alpha_n$ transmitted at instant $nT$.

In geometrical form the characteristic property of the transmitted signal which is shown in the diagram of FIG. 4 for phase modulation, is now that which is shown in analogous manner in the diagram of FIG. 16. From a point $M_{n-1}$ which is the image of the transmitted signal $s(nT-T)$ corresponding with the characterizing pair $[A_{n-1}, \theta_{n-1}]$, the point $M_n$ can be derived which is the image of the signal $s(nT)$ corresponding with the characterizing pair $[A_n, \theta_n]$ by a rotation over an angle $\omega_c T + \Delta\phi_n$, where $\Delta\phi_n = \theta_n - \theta_{n-1}$ and a change in scale by a factor $\Delta A_n = A_n/A_{n-1}$. In like manner as $\Delta\phi_n$ is called phase jump, $\Delta A_n$ may be called amplitude jump.

The characteristics of this similarity are only related with the data signals to be transmitted and with the transmitter carrier.

The signal at the receiver end of the transmission path 1 is distorted and no longer satisfies the geometrical property of the transmitted signal which is shown in FIG. 16. When the transmitted passband signal is supplied to the same filters 3 and 4 as those of the equalizer of FIG. 1 whose coefficients are adjusted so that the output signal of the equalizer satisfies a property analogous to that of the transmitted signal, it can be demonstrated as before that this output signal of the equalizer may be considered to be the equalized passband signal. The property of the equalized signal which must be obtained at the output of the equalizer is shown in geometrical form in the diagram of FIG. 17 which is constructed in the same manner as that of FIG. 5. The image $P_n$ of the signal $y(nT)$ is derived from the image $P_{n-1}$ of the signal $y(nT-T)$ by a rotation over an angle $\omega_o T + \Delta\phi_n$ and a change in scale $\Delta A_n = OP_n/OP_{n-1}$. The absolute phase and the amplitude $B_n$ of the signal $y(nT)$ differ in the general case from the absolute phase and the amplitude $A_n$ of the corresponding transmitted signal $s(nT)$. But just like herebefore it can be proved that, when the signal at the output of the equalizer satisfies the geometrical property of FIG. 17, the transmitted data signals can be recovered perfectly by means of a phase detector and an amplitude detector. Finally, just like herebefore, the passband signal may be considered as being substantially equalized if the output signal of the equalizer satisfies the geometrical property of FIG. 17, if the frequency $\omega_c$ of the transmitter carrier is used which in case of frequency offset produced by the transmission path differs from the frequency $\omega_o$ on receipt.

The criteria which make it possible to adjust the coefficients $a(m)$, $b(m)$ of the two filters of the equalizer in such a manner that the equalized signals are obtained, are identical to those used in the equalizer for phase modulation. So, for example, the most general criterion may be considered which consists of minimizing the quantity $f$ which is given by formula (6). But from the property required for the equalized signal it appears that the end $P_n^e$ of the vector $\overrightarrow{P_n^e P_n}$ which occurs in the formula (6) will be formed in a manner which differs from that which is shown in the diagram of FIG. 6. From the preceding it can be derived that the estimated image point $P_n^e$ of the equalized signal $y^e(nT)$ will be formed from the point $P_{n-1}$ by a rotation over an angle $\omega_c T + \Delta\phi_n$ and a change in scale $\Delta A_n = A_n/A_{n-1}$. To carry this criterion into effect the gradient algorithm is used whereby the quantities $$\frac{\delta f}{\delta a(m)} \text{ and } \frac{\delta f}{\delta b(m)}$$

given by formula (14) are calculated. It is easy to see that in the case of phase and amplitude modulation the ends $K^e_{n-m}$ and $\hat{K}^e_{n-m}$ of the vectors $K^e_{n-m} K_{n-m}$ and $\hat{K}^e_{n-m} \hat{K}_{n-m}$ which occur in these formulas must be formed from the points $K_{n-m-1}$ and $\hat{K}_{n-m-1}$ by a rotation over an angle $\omega_c T + \Delta\phi_n$ and a change in scale $\Delta A_n = A_n/A_{n-1}$.

In the case of phase and amplitude modulation the changes in the coefficients of the equalizer are always performed in accordance with the recursion formula

(15) which is completed by the formulas (16) and (17). But from the preceding it appears that the estimated signals of the relations (18) and (19) have now been obtained by the equations:

$$\begin{cases} y^e(nT) = \Delta A_n[y(nT-T)\cos(\Delta\phi_n + \omega_c T) + \hat{y}(nT-T)\sin(\Delta\phi_n + \omega_c T)] \\ \hat{y}^e(nT) = \Delta A_n[\hat{y}(nT-T)\cos\Delta\phi_n + \omega_c T) - y(nT-T)\sin(\Delta\phi_n + \omega_c T)] \end{cases} \quad (27)$$

$$\begin{cases} x^e(nT-T) = \Delta A_n[x(nT-mT-T)\cos(\Delta\phi_n + \omega_c T) + \hat{x}(nT-mT-T)\sin(\Delta\phi_n + \omega_c T)] \\ \hat{x}^e(nT-T) = \Delta A_n[\hat{x}(nT-mT-T)\cos(\Delta\phi_n + \omega_c T) - x(nT-mT-T)\sin(\Delta\phi_n + \omega_c T)] \end{cases} \quad (28)$$

In the case where the equalizer of FIG. 1 is associated with a transmission system using phase and amplitude modulation, the modification in the adjustment device of the coefficients, shown in this Figure in dashed lines, must be made. An amplitude detector 97 which in the case of differential amplitude modulation supplies the amplitude jumps $\Delta A_n$ direct to a lead 98 is connected to the equalizer output 10. In the case of coherent amplitude modulation it is easy to derive the amplitude jumps $\Delta A_n$ required for the equalizer from the amplitude $A_n$ which are supplied by detector 97. The signals $\Delta A_n$ are supplied on the one hand to an input 99 of phase shifting circuit 23 through lead 98 and on the other hand to an input 100 of each of the phase shifting circuits 39 which are associated with each pair of coefficients $a(m)$, $b(m)$ of the equalizer.

These signals $\Delta A_n$ are used in like manner in the identical phase shifting circuits 23 and 39. So in the diagram of FIG. 8 which, for example, shows a phase shifting circuit 23 the signal $\Delta A_n$ which is available at terminal 99 is supplied to an input of multipliers 101 and 102 which, at their other input receive the signals $\cos(\omega_c T + \Delta\phi_n)$ and $\sin(\omega_c T + \Delta\phi_n)$ supplied by circuits 61 and 62. It is obvious that in this manner the signals $y^e(nT)$ and $\hat{y}^e(nT)$ are obtained at outputs 25 and 26 of the phase shifting circuit in accordance with formula (27).

In the phase shifting circuits 23 and 39 in the various variants of the equalizer according to the invention described so far, in all cases a phase shift $\omega_c T + \Delta\phi_n$ was performed instead of phase shift $\omega_o T + \Delta\phi_n$ which would theoretically be required when the frequency $\omega_o$ of the carrier on receipt differs from the frequency $\omega_c$ of the transmitter carrier. As has been shown, owing to the slight frequency offset caused by the transmission paths and owing to the conception of the equalizer, the sensitivity of the latter for frequency offset is only very small, and in practice an equalization is obtained which is very close to the optimum equalization by using the constant phase $\omega_c T$ in the phase shifting circuits. In certain cases in which the transmission medium would introduce strong frequency offset it is possible to use a device in the phase shifting circuits for controlling the phase $\omega_c T$ in such a way that the frequency offset is taken into account. The control signal for this control may be derived from phase detector 2. This detector, which is, for example, assumed to be of the differential type, measures namely directly the phase deviation $\Delta\phi$ between the signal at its input at the instant $nT$ and that at the instant $nT-T$ and this detector recovers the transmitted phase jump $\Delta\phi_n$ from this phase deviation $\Delta\phi$. The difference $\epsilon_n$ between the measured phase deviation $\Delta\phi$ and the recovered phase jump $\Delta\phi_n$ is a characterizing quantity for the frequency offset $\Delta\omega = \omega_o - \omega_c$ which is produced by the transmission path if the latter is perfect or is corrected by the equalizer. It is this difference signal $\epsilon_n = \Delta\phi - \Delta\phi_n$ which can be used in phase shifting circuits 23 and 39 to change the phase $\omega_c T$ by using the recursion formula:

$$(\omega_c T)^{n+1} = (\omega_c T)^n + \alpha' \epsilon_n \quad (29)$$

where $\alpha'$ is a constant.

The changes to be introduced in the equalizer for performing this control will be explained by means of FIG. 18.

In this FIG. 18 some elements of FIG. 1 are shown for which the same reference numerals have been used. The phase detector 2 which is connected to equalizer output 10 supplies the phase jumps $\Delta\phi_n$. The detector is provided with an extra output 103 for supplying the measured phase deviation $\Delta\phi$. A difference circuit 104 supplies the difference signal $\epsilon_n = \Delta\phi - \Delta\phi_n$ which is supplied to the identical phase shifting circuits 23 and 29 in which this signal is used in the same way. So, for example, the processing the signal $\epsilon_n$ in circuit 23 is described. In this circuit 23 which is assumed to have been constructed in accordance with the diagram of FIG. 8, only a few elements are shown which have been indicated in the same manner as in FIG. 8. The adder 60 supplies the quantity $\omega_c T + \Delta\phi_n$ to circuits 61 and 62, starting from the phase jumps $\Delta\phi_n$ present at terminal 24 and from the quantity $\omega_c T$ which is derived from a memory 105. In accordance with the formula (29) the quantity $\epsilon_n$ which is available at an input terminal 106 of the phase shifting circuit is multiplied at each iteration step $n$ by the constant $\alpha'$ in a multiplier 107 and the quantity $\alpha' \epsilon_n$ is added in an adder 108 to the quantity $(\omega_c T)^n$ which is stored in memory 105 so that the contents of this memory become $(\omega_c T)^n + \alpha' \epsilon_n$ at iteration step (n+1). The other elements of phase shifting circuit 23 of FIG. 18 are identical to those of FIG. 8 and have not been shown.

What is claimed is:

1. An automatic equalizer for equalizing passband signals at the input of a receiver in a system for transmitting data signals by means of phase modulation of a carrier at a fixed clock rate, the equalizer including two adjustable filters with means for storing filter coefficients, which filters process the in-phase and quadrature-phase components of the passband signal respectively, and means for combining output signals from the two filters to produce an equalizer output signal, comprising: means for forming in-phase and quadrature-phase components of the equalizer output signal; sampler means for sampling each of said components of the equalizer output signal at the clock rate; delay circuits for delaying each of said sampled components over one clock period; a first phase shifting circuit receiving each of said delayed sampled components for producing in a signal, whose in-phase and quadrature-phase components are constituted by these delayed sampled components, a phase shift equal to the sum of each phase jump corresponding with the transmitted data signals and being derived from a phase detector included in the receiver and the phase rotation of the carrier during one clock period, the first phase shifting circuit outputting at least one of the in-phase and quadrature-phase components of the phase-shifted signal; at least one first difference circuit for forming a difference signal between one of said sampled components of the equalizer output signal and a corresponding component of the phase-shifted signal at the first phase shifting circuit output, and further comprising in association with each pair of corresponding filter coefficients of the two filters; sampler means for sampling each of the in-phase and quadrature-phase components of the passband signal corresponding with said pair of filter coefficients at the clock rate; means including delay circuits for producing sampled in-phase and quadrature-phase components of this passband signal delayed over one clock period; a second phase shifting circuit receiving each of said delayed sampled components of this passband signal for producing in a signal, whose in-phase and quadrature-phase components are constituted by these delayed sampled components, a phase shift equal to the phase shift produced by the first phase shifting circuit, the second phase shifting circuit outputting the in-phase and quadrature-phase components of the phase-shifted signal; a pair of second difference circuits for forming difference signals between corresponding components of this passband signal and the phase-shifted signal at the second phase shifting circuit output; a calculator circuit for calculating changes in said pair of filter coefficients in the form of at least one combination of products between the difference signals from the first difference circuit and the pair of second difference circuits; and means for combining the calculated changes with said pair of filter coefficients to a pair of new filter coefficients and storing this pair of new filter coefficients in the filter coefficient storing means.

2. An equalizer as claimed in claim 1, wherein the equalizer is provided with a first pair of difference circuits which at their first input receive the sampled in-phase and quadrature components respectively of the equalizer output signal and at their second inputs corresponding components of the said phase-shifted delayed signal of the first phase shifting circuit and in that the said calculating circuit is arranged for calculating changes in the said pair of coefficients in the form of two combinations of products of pairs of output signals of said pairs of first and second difference circuits.

3. An equalizer as claimed in claim 2, characterized in that each of the said phase shifting circuits comprises an adder for forming the sum of each phase jump $\Delta\phi_n$ corresponding with the transmitted data signal and of the phase shift $\omega_c T$ of the transmitter carrier during the data clock period T, $\omega_c$ being the frequency of the transmitter carrier, in which the output of this adder is connected to two circuits for calculating the terms $\cos(\omega_c T+\Delta\phi_n)$ and $\sin(\omega_c T+\Delta\phi_n)$, the two components of the output signal of said phase shifting circuit being obtained by means of multipliers and adders which form two combination of products of the above said cosine and sine terms with the two signal components supplied to the inputs of said phase shifting circuits.

4. An equalizer as claimed in claim 3, characterized in that the carrier frequency used in the phase shifting circuits is adjusted by an adjusting circuit controlled by an error signal corresponding with the carrier frequency offset produced by the transmission path.

5. An equalizer as claimed in claim 4, characterized in that the said error signal is obtained by means of a circuit for forming the difference between the phase jumps at the input of the phase detector, which phase jumps are measured in this detector, and the phase jumps corresponding with the transmitted data signals and being derived from the output of the phase detector.

6. An equalizer as claimed in claim 2, characterized in that in the circuit for calculating the changes in the coefficients only the sign of one of the pairs of input signals is used, this circuit also comprising detection circuits for detecting the sign of this pair of input signals, routing circuits for the other pair of input signals which are controlled by the sign detection circuits and, finally, adders connected to said routing circuits for forming the combinations corresponding with the changes in the coefficients.

7. An equalizer as claimed in claim 2, characterized in that the circuits for calculating the changes in the coefficients only the sign of the two pairs of input signals are used, this circuit also comprising detection circuits for detecting the sign of these pairs of input signals, logic circuits for forming products of these two pairs of input signals in the form of products of their signs and, finally, adders connected to said logic circuits for forming combinations corresponding with the changes in the coefficients.

8. An equalizer as claimed in claim 2, characterized in that the changes in the coefficients are only calculated at the instants at which predetermined phase jumps appear at the output of the phase detector, which equalizer comprises a selection circuit which receives phase jumps from the phase detector corresponding with the data signals and which selects the said predetermined phase jumps to supply them to the phase shifting circuits.

9. An equalizer as claimed in claim 8 in a data transmission system in which certain phase jumps among the phase jumps corresponding with the data signals are such that the angle $\omega_c T+\Delta\phi_n$ is equal to 0° or to a multiple of 90°, characterized in that at least part of these phase jumps constitute said predetermined phase jumps used in the phase shifting circuit, these phase shifting circuits being formed by means of routing circuits controlled by the signals corresponding with said predetermined phase jumps, these routing circuits being arranged for producing from the two signal components supplied to the inputs of the phase shifting circuits the two phase shifted signal components corresponding with said predetermined phase jumps.

10. An equalizer as claimed in claim 1, which equalizer comprises only one difference circuit, characterized in that the said calculation circuit for calculating changes in the said pair of coefficients comprises two multipliers which receive at their first inputs the difference signal of the first difference circuit and at their second inputs the respective output signals of the pair of second difference circuits which are associated with this said pair of coefficients.

11. An equalizer as claimed in claim 10, characterized in that it is associated with a data transmission system in which the phase jumps corresponding with the data signals are 90° apart.

12. An equalizer as claimed in claim 1, arranged for equalizing a passband signal at the input of a receiver in a system for data transmission by means of phase and amplitude modulation of a carrier, characterized in that each of said phase shifting circuit is provided with means for producing output signal components whose amplitude is multiplied by amplitude jumps associated with the transmitted data signals and derived from an amplitude detector of the receiver.

13. An equalizer as claimed in claim 1, characterized in that samples of the quadrature component of the equalized signal at the data clock frequency are obtained by interchanging for each pair of corresponding coefficients of the two filters the coefficients used for obtaining samples of the in-phase component of the equalized signal and by reversing the sign of one of the coefficients.

* * * * *